United States Patent [19]

Denizou

[11] Patent Number: 5,006,305
[45] Date of Patent: Apr. 9, 1991

[54] DEVICE FOR GUIDING THE CONTROL CLUSTERS OF NUCLEAR REACTORS

[75] Inventor: Jean-Pierre Denizou, Craponne, France

[73] Assignee: Framatome & CIE., Courbevoie, France

[21] Appl. No.: 617,230

[22] Filed: Jun. 4, 1984

[30] Foreign Application Priority Data

Jun. 3, 1983 [FR] France ................. 83 09275

[51] Int. Cl.$^5$ .................. G21C 7/08; G21C 15/00
[52] U.S. Cl. ........................... 376/353; 376/327
[58] Field of Search .................... 376/327, 353

[56] References Cited

U.S. PATENT DOCUMENTS

| | | | |
|---|---|---|---|
| 3,481,832 | 12/1969 | Rickert | 376/353 |
| 3,849,257 | 11/1974 | Bevilacqua | 376/353 |
| 3,940,311 | 2/1976 | Frisch et al. | 376/353 |
| 4,173,513 | 11/1979 | Obermeyer et al. | 376/353 |
| 4,562,038 | 12/1985 | Assedo et al. | 376/353 |

FOREIGN PATENT DOCUMENTS

| | | |
|---|---|---|
| 2254859 | 7/1975 | France . |
| 2399715 | 3/1979 | France . |
| 2411469 | 8/1979 | France ................. 376/353 |

*Primary Examiner*—Harvey E. Behrend
*Attorney, Agent, or Firm*—Pollock, Vande Sande & Priddy

[57] ABSTRACT

Device for guiding nuclear reactor control clusters consisting of several absorbing rods including guide casings, associated respectively with the various control clusters, and, inside each casing, horizontal plates (14) ensuring, in the upper part, discontinuous guidance at intermediate levels for the various elements of the control cluster. In the lower part of the casing, guidance of the rods arranged in pairs sharing one radius is achieved by combining horizontal plates (14) ensuring mechanical guidance of the rods with casings (22) which reduce the hydraulic effects to a minimum by calming the cooling fluid in the radial direction around the said absorbing rods. The invention applies to pressurized water nuclear reactors.

1 Claim, 3 Drawing Sheets

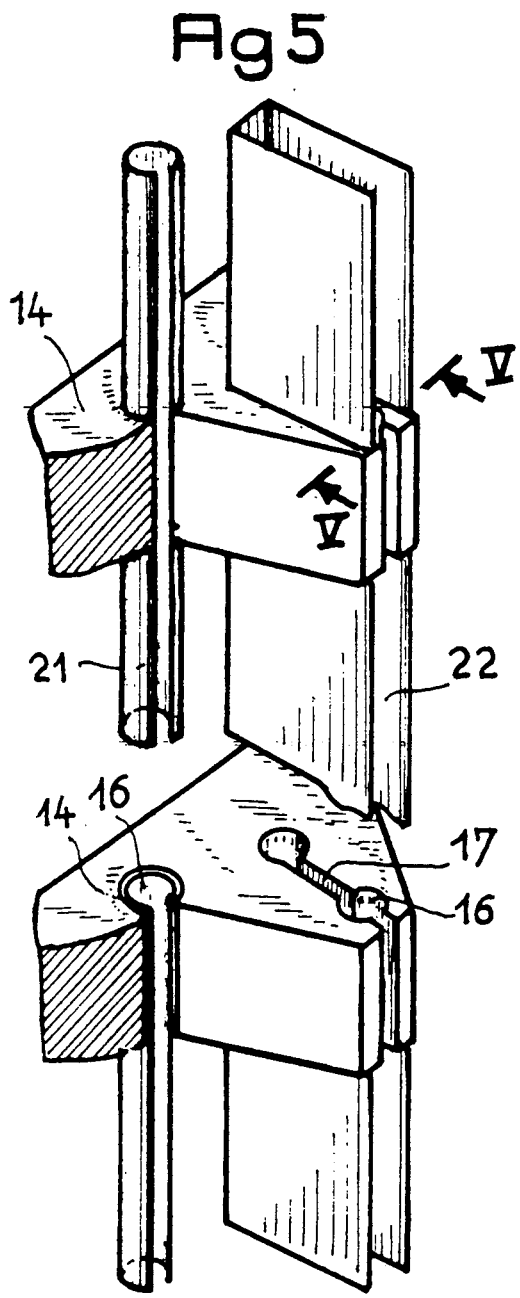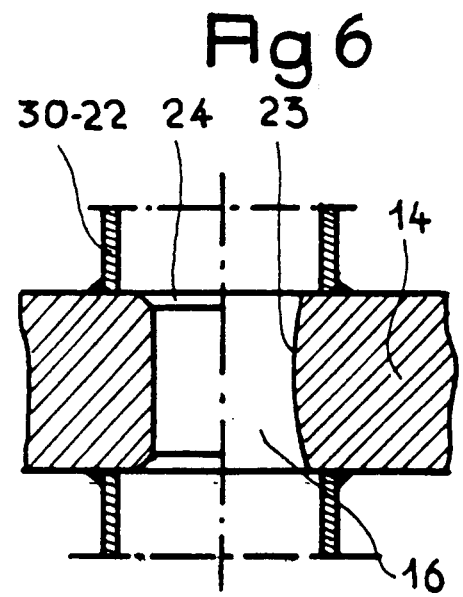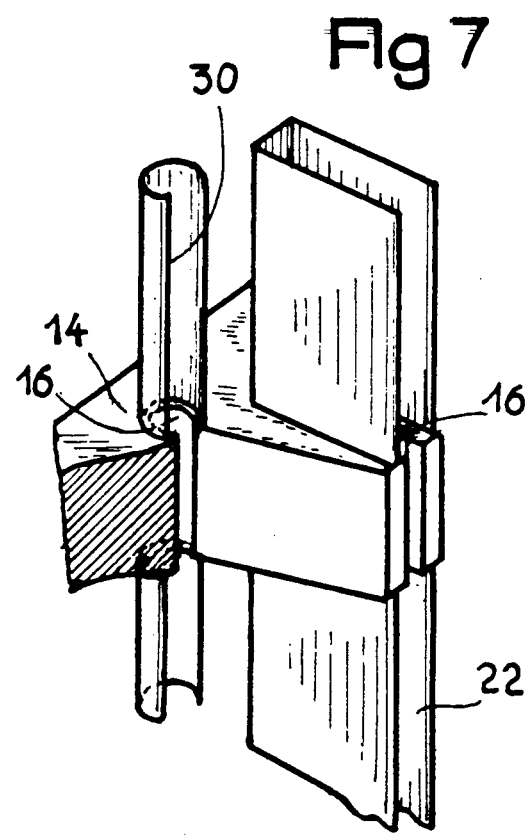

DEVICE FOR GUIDING THE CONTROL CLUSTERS OF NUCLEAR REACTORS

FIELD OF THE INVENTION

The invention relates to a device for continuous guiding of the control clusters in a nuclear reactor.

In pressurized water reactors, the control of the reactivity is carried out by movement of control clusters, each consisting of a series of absorbing rods which are driven by the same common shaft and move in tubes which constitute the supporting frame of the fuel elements forming the core of the reactor. The fuel elements are themselves assemblies formed by a large number of mutually parallel rods, of small diameter, supported laterally by grids joined to the tubes which form the supporting frame of the fuel element and permitting the introduction of the absorbing rods, by a movement of the control cluster. The upper ends of the absorbing rods are joined to the lower end of the control rod, by means of a multi-arm star-shaped carrier called a "spider".

The operation of the control clusters implies that the absorbing rods can be withdrawn completely outside the core, even when they are very long, with a length which is substantially equal to that of the fuel assemblies, and without their being interconnected other than at the upper end, where the "spider" is to be bound. This is what makes it essential to guide the clusters, and even each absorbing rod individually, through the entire length of their travel above the core.

PRIOR ART

To ensure this guiding, use is made conventionally of tubular casings or guiding tubes, which are of sufficient length to cover the whole length from the core plate defining the upper boundary of the core, through which only the absorbing rods of the control cluster pass to enter the fuel assemblies, as far as an upper support plate which carries the weight of the guiding tubes.

The guiding casings, which thus form part of the upper internal equipment of the reactor, are exposed to the primary cooling fluid which emerges vertically from the fuel assemblies at the upper end of the core, to be then directed towards the lateral outlets through which it leaves the vessel containing the core. They are, therefore, situated in a region of high turbulence. Consequently, the casings must not only ensure efficient guidance of the absorbing rods so that the latter can be introduced, for example in the event of an emergency stoppage, as quickly as possible among the fuel rods, but in addition they must satisfy severe requirements in respect of mechanical strength. They must, in particular, be strong in torsion and in flexion; in fact, they must stand up to the considerable radial and vibrational forces resulting from the turbulence of the primary cooling fluid, as well as, moreover, possible forces due to earth tremors. They must also be capable of withstanding sudden pressure variations without deformation, particularly in the event of a rupture of a pipeline in the primary circuit. Moreover, they take part in the discharge and in the redirection of the primary fluid entering inside through the orifices for the passage of the absorbing rods of the control cluster, and they must do this while producing the least possible pressure drop.

In accordance with these essential requirements, a device for guiding a control cluster is known which comprises a tubular casing extending between an upper core plate and a supporting plate. Horizontal plates which permit the upward discharge of the primary cooling liquid are placed inside, the guiding casing to provide discontinuous guidance of the rods. In its lower part, the casing contains a set of guide sheaths provided with slides which ensure continuous guidance of the rods. Each guide sheath has a lengthwise slot permitting the passage of "the spider". The casing is equipped, over a height corresponding to the continuous guidance or over a greater height, with openings for the discharge and diversion of the primary cooling fluid. The guide casing receives the upward flow of liquid which comes out of the fuel assemblies vertically, at the upper end of the core, to be then redirected horizontally towards the side outlets of the vessel. It is therefore situated in a region of high turbulence. In the continuous guiding zone there is a pressure gradient in a horizontal plane. Since each guide sheath is open, this pressure gradient tends to apply the absorbing rod to the lips of the slot, causing frictional wear. To limit this phenomenon, pressure-equalizing openings are provided in the faces of the guide sheaths, but this may entail a reduction in mechanical strength.

According to another solution, each guide casing comprises, in its lower region, individual tubes for guiding the rods continuously, these tubes being integrally fixed at each of their ends to, on the one hand, a first tube plate forming the lower end of the casing as such and, on the other hand, a second, positioning tube plate intended merely to block the fuel elements in the core. However, these tubes for continuous guidance do not allow the "spider" to pass, thus restricting the travel of the control clusters. It is therefore necessary to increase the length of the absorbing rods and, as a result, the height of the vessel.

SUMMARY OF THE INVENTION

To overcome the disadvantages, outlined above, of the various known guidance devices, the invention is aimed at providing continuous guidance of each absorbing rod in a control cluster in order that the pressure imbalances around the rod may be reduced to a minimum or eliminated, without this guidance requiring changes in the design of the guide casings, of the internal equipment or of the vessel. Moreover, the invention makes it possible to reduce the effects of the hydraulic thrust inside the continuous guide by equilibrating the pressures around the absorbing rod, while offering the advantages of great durability and lower manufacturing cost. The invention has, therefore, as its subject a device for guiding the control clusters of a nuclear reactor, each cluster being formed by a plurality of vertically movable absorbing rods joined together with a spider with radial arms to an axial shaft for common control, and means for guiding the control clusters in their movements, out of the core, the said means containing guide casings inside which horizontal plates ensure, in the upper part of the casings, discontinuous guidance of the various components of the control cluster, wherein, in the lower part of the casings, in the zone called the continuous guidance zone, the guiding of the absorbing rods which are positioned in pairs sharing one radius is achieved by the combination of the horizontal plates providing mechanical guidance of the rods with casings which minimize the hydraulic effects by calming the cooling fluid in the radial direction around the said absorbing rods.

According to a characteristic feature, the hydraulic casings are arranged between the horizontal plates as discontinuous spacers.

BRIEF DESCRIPTION OF THE DRAWINGS

The invention will be better understood with the aid of the following description of an example of embodiment with reference to the attached drawings, in which

FIG. 5 is a part-view in perspective of the device for continuous guidance in perspective;

FIG. 6 is a view in transversal cross-section along line V—V of FIG. 5, showing two alternative forms of the hole for guiding the absorbing rods; and FIG. 7 is a part-view in perspective of an alternate form of the guiding device in perspective.

DETAILED DESCRIPTION

Figure 1:
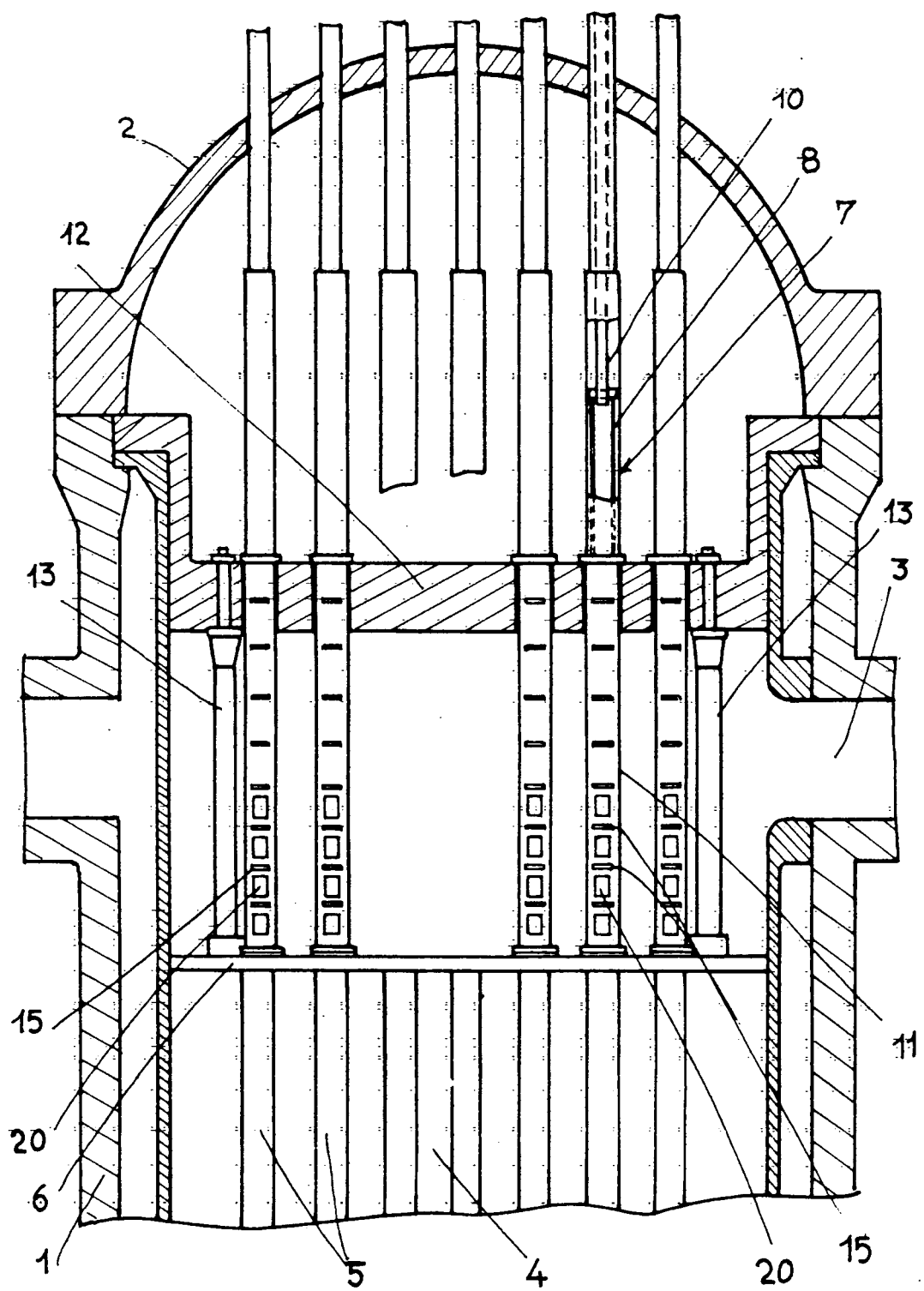
FIG. 1 is general view of the upper part of the reactor, in vertical cross-section.

The reactor in question is a reactor of the pressurized water type, in which the reactor core is enclosed in a vessel under pressure and carries cooling water which passes upwards through it. Since the invention is concerned with the implementation of guiding of the reactivity control clusters, above the core, only the upper part of the reactor has been shown in FIG. 1. However, portions of the core 4 and the vessel 1, with its cover 2 and, at the side, one of the water outlet pipes 3, can also be seen.

The core is formed by a group of fuel assemblies 5 placed side by side, each formed by a large number of vertical rods of a fuel material. The upper boundary of the core, just above the fuel assemblies, is defined by a core plate 6. The control of reactivity during operation is carried out by introducing a varying number of control clusters into some of the core assemblies. Each of these control clusters 7 consists of several rods 8, of an absorbing material, joined together at their upper end by a spider 9 with radial arms, integrally fixed to a control shaft 10. The clusters are maneuvered from outside the vessel so as to move the absorbing rods longitudinally between the fuel rods of the corresponding assembly. The core plate 6 is pierced with openings permitting, on the one hand, the passage of the absorbing rods entering the core and, on the other hand, the outflow of the cooling water which leaves the core to be diverted next towards the pipes 3 which are situated at a level above that of the core plate 6.

Above the core, the movements of the control clusters are guided by parallelepiped-shaped casings 11, suspended vertically from an upper support plate 12 which transmits the weight of the whole of the control cluster guidance device to the vessel 1. Beside the casings 11, the core plate 6 and the upper support plate 12 are joined together by columns 13.

Each casing 11 surrounds all of the rods of the control cluster for whose guidance it is responsible. It passes through the upper support plate 12 from which it is suspended by a bolted flange. Intermediate guide plates 14 are, mounted across the casing at regular intervals at various heights, each guide plate engaging in the four faces of the casing through openings 15 cut in the wall of the casing, and being welded to the casing along these openings.

The role of the guide plate 14, above the continuous guiding zone, is to provide accurate guidance of the spider 9 at the time when the whole control cluster is falling.

Figure 2:
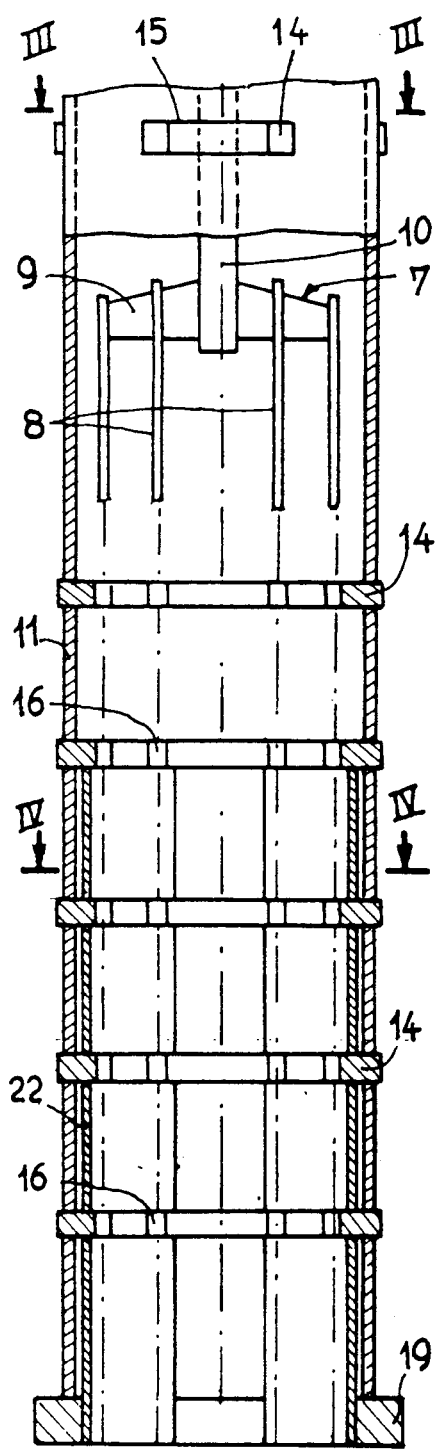
FIG. 2 is a view of a guidance device, in vertical cross-section passing through the double guide sheaths.
Figure 3:
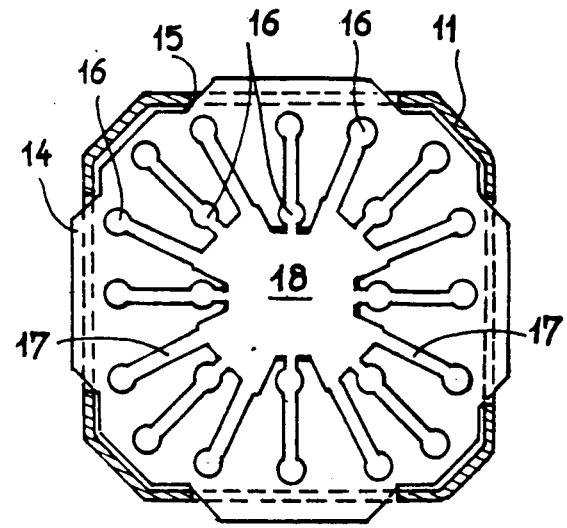
FIG. 3 is a view in transversal cross-section along line III—III of FIG. 2.
Figure 4:
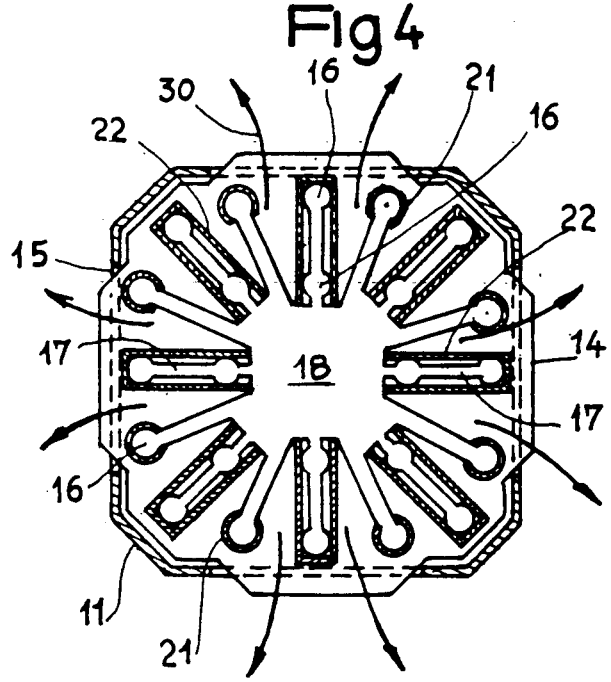
FIG. 4 is a view in transversal cross-section along line IV—IV of FIG. 2.

The intermediate guide plates 14 provide, in the upper part of each casing 11, discontinuous guidance of the various components of the control cluster and, in the lower part, a continuous guidance through the intermediacy of guide sheaths, as will be seen later. For this purpose, they have (FIGS. 3 and 4) circular holes 16 for guiding the individual absorbing rods and, furthermore, radial slots 17 which join the holes 16 together and to a wide central opening 18, which also permits the passage and the guidance of the spider 9 and of the control shaft 10. The spider 9 can descend below the plate 19 (FIG. 2) which forms a flange for locating the guidance device on the upper core plate 6.

The locating is ensured by centering studs which are fixed in the upper core plate. The flange plate 19 is provided with openings opposite the said upper core plate 6 to allow the passage of the cooling liquid leaving the core. The casing 11 is equipped, over a height corresponding to the continuous guiding or over a greater height, with openings 20, permitting the lateral discharge of the rising liquid flow.

In the lower part of the casings 11, in the zone called the continuous guidance zone, the guiding of the various components of the control cluster 7 is ensured by guide plates 14 and vertical sheaths which consist of slotted tubes 21 for those absorbing rods which are furthest from the axis and are not aligned radially with other rods located closer to the axis and of hydraulic casings 22 for all the other absorbing rods positioned in radially aligned pairs and subjected to the highest hydraulic flow.

The slotted tubes 21 (FIG. 5) whose internal diameter is adjusted to the diameter of the rods 8, pass through the guide plates 14 and then ensure only the continuous guiding of the individual peripheral rods and the guiding of the spider 9 during the fall of the control cluster.

The hydraulic casings 22 have a U-shaped cross-section with a constant thickness and are arranged between the guide plates 14. They are, furthermore, joined to the said plates by welding in the manner of discontinuous spacers and can be produced by forming sheet metal. Their seating takes place on the plate 14 in radially directed parts, each plate having two guide holes 16 with a small clearance for the absorbing rods 8 or the spider 9. The bottom of the hydraulic casings 22 is straight of rounded.

Furthermore, the holes 16 for the mechanical guidance of those absorbing rods which are positioned in pairs are either of a shape widening 23 in the axial direction towards the faces of the plates 14, or are provided with chamfers 24 (FIG. 6).

The upward flow of the cooling liquid leaving the fuel elements 5 fills the casings 11 and the gaps between the rods and the guide sheaths. The circulation currents shown by the arrows 30 (FIG. 4) produce, in a horizontal plane, four high velocity zones opposite the casing openings 20, and four zones of lower velocity corresponding with the corners of the casing. These four radial and opposed hydraulic flows maintain, inside the hydraulic casings 22, an overpressure and there are no radially directed flow lines but, on the other hand, a weak axial current resulting from the wide water channel cross-sections between the rods 8 and the casings 22. The pressure is therefore distributed uniformly in a radial plane for all the internal fluid. As a result, the absorbing rods of the clusters are not biased by differential hydraulic forces over the radial cross-section and remain held in a quiescent fluid. The hydraulic casings acts as hydraulic flow-dampers around the absorbing rods of the control clusters.

For the hydraulic casings situated in the corners of the guiding casing, the function is identical in respect of the radial hydraulic flow leaving by both adjacent faces. On the other hand, if an imbalance occurs between the flows leaving radially by two adjacent faces for reasons of geometrical configuration downstream of the guide casing, the casings protect the rods also against the transversal forces generated by these imbalances in flow. The holes in the intermediate guide plates still function as mechanical guides for the absorbing rods.

In the alternate form of FIG. 7, the hydraulic casings 22 are identical to those of the preceding example but, in this case, the slotted tubes 30 for the individual peripheral rods have an internal diameter which is greater, than the diameter of the rods for defining a clearance with said rods and are arranged between the guide plates 14. They are joined to the said plates by being welded in the manner of discontinuous spacers, each plate retaining the guide holes 16 with a small play for the absorbing rods 8 or the spider 9. These holes 16 again are either of a shape widening in the axial direction towards the faces of the guide plates, or are equipped with chamfers.

The slotted tubes 30 thus make it possible to minimize, around the individual peripheral rods, the hydraulic forces by calming the cooling fluid in the radial direction, and to reduce the effects of hydraulic overpressure during the fall of the control cluster.

The device of the invention can be employed in all continuous guiding zones for slender rods mounted on multi-arm supports, which it is desired to protect from the forces of radial and transversal hydraulic currents. Moreover, with the guiding being ensured by elements over reduced lengths, the wear of the cluster rods during movements is reduced to a minimum, thus providing further scope for the permissible frequency of these movements, opening the way to modern modes of operation by remote control or load-following.

I claim:

1. A nuclear reactor having:
   a reactor vessel,
   a reactor core comprising fuel assemblies located side by side in upright position,
   an upper core plate located above said core and formed with coolant openings for upward circulation of coolant out of said core,
   an upper support plate spaced above said upper core plate and carried by said vessel,
   a plurality of control clusters each having a plurality of vertical neutron absorbing rods joined together at their upper ends by a spider and each movable from a position where said rods are in said core and a position where said rods are above said core, the rods in any one of said clusters including pairs of two said rods with the rods in a pair being aligned along a direction radial to an axis of the cluster,
   and a plurality of guiding devices each associated with one of said control clusters,
   wherein each said guiding device includes
   (a) a vertical housing mounted between said upper support plate and said upper core plate in vertical alignment with one of said fuel assemblies and having a cross-section greater than that of the associated one of said control clusters,
   (b) a plurality of horizontal guide plates securely connected to said housing and distributed at intervals along and within said casing, each of said plates being formed with guiding holes and radially directed openings of a shape corresponding to the cross-section of said rods and spider for slidably guiding said rods at discontinuous intervals only, and
   (c) a plurality of U-shaped, folded sheet metal, coolant guiding casings each located between two adjacent ones of said guide plates in a lower portion of said housing and each surrounding one of said pairs and opening radially inwardly, each said casing having a section defining a gap with the associated pair of rods substantially devoid of radial coolant flow.

* * * * *